(12) United States Patent
Raybould et al.

(10) Patent No.: US 7,323,247 B2
(45) Date of Patent: Jan. 29, 2008

(54) OXIDATION BARRIER COATINGS FOR SILICON BASED CERAMICS

(75) Inventors: Derek Raybould, Denville, NJ (US); Chien-Wei Li, Livingston, NJ (US); Bjoern Schenk, Phoenix, AZ (US); Thomas E. Strangman, Prescott, AZ (US); Paul Chipko, Blairstown, NJ (US); Lee Poandl, Middlesex, NJ (US)

(73) Assignee: Honeywell International, Inc., Morristown, NJ (US)

( * ) Notice: Subject to any disclaimer, the term of this patent is extended or adjusted under 35 U.S.C. 154(b) by 434 days.

(21) Appl. No.: 10/719,629

(22) Filed: Nov. 21, 2003

(65) Prior Publication Data

US 2005/0112381 A1 May 26, 2005

(51) Int. Cl.
*B32B 9/00* (2006.01)

(52) U.S. Cl. ...................................................... 428/408

(58) Field of Classification Search ................ 428/701, 428/446, 448, 697, 408; 501/98, 152
See application file for complete search history.

(56) References Cited

U.S. PATENT DOCUMENTS

| | | | |
|---|---|---|---|
| 4,105,371 A | 8/1978 | Savage et al. | |
| 4,400,427 A | 8/1983 | Moschetti et al. | |
| 4,713,302 A | 12/1987 | Komatsu | |
| 5,407,001 A | 4/1995 | Yasrebi et al. | |
| 5,535,811 A | 7/1996 | Feagin | |
| 5,683,825 A | 11/1997 | Bruce et al. | |
| 5,738,819 A | 4/1998 | Feagin | |
| 5,939,197 A | 8/1999 | Blohowiak et al. | |
| 5,944,088 A | 8/1999 | Feagin | |
| 5,985,470 A | 11/1999 | Spitsberg et al. | |
| 6,207,295 B1 * | 3/2001 | Stowell et al. ............... 428/615 | |
| 6,254,935 B1 | 7/2001 | Eaton et al. | |
| 6,296,941 B1 | 10/2001 | Eaton, Jr. et al. | |
| 6,299,988 B1 | 10/2001 | Wang et al. | |
| 6,312,763 B1 | 11/2001 | Eaton, Jr. et al. | |
| 6,331,362 B1 | 12/2001 | Dupel et al. | |
| 6,387,456 B1 | 5/2002 | Eaton, Jr. et al. | |
| 6,682,821 B2 * | 1/2004 | Fukudome et al. ......... 428/446 |
| 6,733,908 B1 * | 5/2004 | Lee et al. .................... 428/702 |
| 6,759,151 B1 * | 7/2004 | Lee ............................ 428/701 |
| 2002/0098391 A1 | 7/2002 | Tanaka et al. | |

* cited by examiner

*Primary Examiner*—John J. Zimmerman
*Assistant Examiner*—Daniel Miller
(74) *Attorney, Agent, or Firm*—Ingrassia Fisher & Lorenz (57) ABSTRACT

A protective barrier coating system including a diffusion barrier coating and an oxidation barrier coating and method for use in protecting silicon-based ceramic turbine engine components. A complete barrier coating system includes a thermal barrier coating of stabilized zirconia and an environmental barrier coating of an alloyed tantalum oxide. The oxidation barrier coating includes a layer of metallic silicates formed on a substrate of silicon nitride or silicon carbide to be protected. The oxidation barrier coating can include silicates of scandium, ytterbia or yttrium. The oxidation barrier coating may also include an inner layer of $Si_2ON_2$ between the diffusion barrier and the metallic silicate layer. The oxidation barrier coating can be applied to the substrate by spraying, slurry dipping and sintering, by a sol-gel process followed by sintering, by plasma spray, or by electron beam-physical vapor deposition. The diffusion layer of essentially pure $Si_3N_4$ can be applied to the substrate to prevent the migration of damaging cations from the protective layers to the substrate and is preferably formed by chemical vapor deposition. A method for protecting silicon based substrates can comprise a step of forming an oxidation barrier coating on a substrate, where a step of forming the oxidation barrier includes a step of sintering the oxidation barrier and substrate in a wet gas containing hydrogen.

26 Claims, 3 Drawing Sheets

OXIDATION BARRIER COATINGS FOR SILICON BASED CERAMICS

BACKGROUND OF THE INVENTION

The present invention relates generally to coatings for ceramics, and, more particularly, to apparatus and methods to protect ceramic surfaces in high temperature, moisture rich environments.

Both airfoils and combustors made from silicon nitride or silicon carbide have the potential to appreciably increase the operating temperatures of turbine engines. The high temperature and high pressure environment of the turbine engine as well as the high gas velocity can cause erosion of silicon based ceramics. The mechanism of some of the erosion loss is due to the formation of $SiO_2$. Typically, combustion gas environments, including turbine engines, contain about 10% water vapor. Oxygen containing water in the turbine reacts with silicon nitride and silicon carbide to form silica scale on silicon based ceramic surfaces. Water vapor can also react with the silica scale to form silicon hydroxide, which is volatile. Evaporation of silicon hydroxide from ceramic surfaces and erosion of ceramic caused by high speed combustion gases passing over ceramic surfaces leads to the loss of ceramic material from ceramic combustor and turbine components at rates of a few microns per hour.

U.S. Pat. No. 6,159,553 and US 202136835 A1 show one method of protecting ceramic coatings. Tantalum oxide alloyed with lanthanum oxide provides an environmental coating (EBC). However, tantalum oxide permits diffusion of oxygen, resulting in the formation of a $SiO_2$ layer below the tantalum oxide layer. As long as the $SiO_2$ layer is thin, <10 microns, and free of stress cracking, it provides a barrier to additional oxidation. Protection for over 500 hours at 2200° F. (1200° C.) was observed in a Keiser rig at approximately 1.5 atmospheres of water vapor. Protection in a cyclic oxidation air environment was demonstrated at 2400° F. (1315° C.) for 2000 hours after which the interfacial silica layer was less than 10 microns and un-cracked.

However, thicker silica layers in the range of 20 to 25 microns developed during 500 hours in a Keiser test rig at 0.3 to 2 atmospheres of water vapor and 2400° F. (1315° C.). The thicker $SiO_2$ scale was predominately crystobalite, and was excessively cracked during cooling from the operating temperature. In addition, to compromising the adhesion of the tantalum oxide coating, the crystobalite reduced the mechanical strength of the $Si_3N_4$ substrate. As disclosed in U.S. Pat. No. 6,159,553, line of sight coating techniques such as plasma spray have been used to apply coatings such as tantalum oxide. However, plasma spray does not deposit a uniform thickness coating onto complex shapes such as multi-airfoil components.

Published US patent application 2002/0098391 by Tanaka et al discloses the use of rare earth silicates to form a protective coating to a silicon based substrate ceramic material. But the process disclosed by Tanaka limits the coating composition because it allows interaction of the coating with the substrate. Specifically, in the Tanaka reference, concentrations of rare earth oxides, in excess of the amounts specifically called for, will be free to diffuse from the substrate into the coatings causing undesirable changes (i.e., weakened oxidation sites) in the coating material. Thus, the manufacturing processes required to achieve the correct compositions required in Tanaka are more critical and therefore more expensive.

The Tanaka reference additionally requires a relatively thick coat of silicate or disilicate in the range of 50 to 500 microns. Thick dense coatings are well known to reduce the strength of the substrate. In addition, thick coatings can not beneficially be applied to airfoil like applications as they add too much weight to the airfoil and, because space is limited, result in the thickness of the airfoil having to be reduced and hence its load carrying capacity. In contrast, thick coatings are viable on lower-stress combustor and turbine shroud components. The sintering process for the coating disclosed by the Tanaka reference also requires a relatively high sintering temperature in the range 1650 to 1800° C. (3000 to 3270° F.). This high sintering temperature can limit and compromise the strength properties of the substrate. In addition, the functional cycle times and operating temperatures reported in Tanaka are inadequate to meet turbine engine requirements. For instance, Tanaka reports coated parts surviving 1400° C. (2550° F.) for 30 cycles (1 cycle is starting at room temperature, raising to operating temperature and then returning), whereas a turbine engine might require components to survive 1400° C. (2550° F.) for 1000 cycles. Further, the testing conducted in the Tanaka reference was reported in air which is less demanding than the moist environment of a turbine engine. Finally, the Tanaka reference discloses an approach that requires sintering additives for the silicon nitride substrate that must be of the same rare earth used in the coating. This requirement would eliminate possible unfavorable reactions between the coating and the substrate's sintering aid, but limits the range of coatings that can be used. Thus for example, if yttrium compounds are used as sintering aids in the formation of the substrate, then the oxidation coating of Tanaka must also be of yttrium compounds to avoid unfavorable reactions. For example a lanthanum compound is beneficial as a sintering aid in the silicon nitride, but is detrimental in the protective coatings. Tanaka's approach avoids lanthanum compound additions in the silicon nitride to avoid their diffusion into the coatings.

As can be seen, there is a need for an improved coating and method to apply the coating for a high temperature (>2200° F. (1200° C.)) barrier between an environmental coating and a substrate of silicon nitride or silicon carbide. There is also a need for a diffusion coating that will prevent migration of cations out of a silicon-based substrate. There is as well a need to coat complex parts with a uniform dense oxidation coating at a minimal cost.

SUMMARY OF THE INVENTION

In one aspect of the invention, a protective coating for a silicon-based substrate comprises an oxidation barrier coating formed on the substrate consisting of a metallic silicate. The protective coating may include an environmental barrier coating of tantalum oxide alloy and a thermal barrier coating of stabilized zirconia formed on the environmental barrier coating.

In a further aspect of the invention, a protective barrier coating for a silicon-based substrate includes a diffusion barrier coating formed on the substrate. An oxidation barrier coating formed on the diffusion barrier coating includes scandium silicate. A tantalum oxide alloy environmental barrier coating may be formed on the oxidation barrier coating and a stabilized zirconia thermal barrier coating may be formed on the environmental barrier coating.

In a further aspect of the invention, a protective barrier coating for a silicon-based substrate includes a diffusion barrier coating formed on the substrate. A duplex oxidation barrier coating formed on the diffusion barrier coating consisting of an inner layer of $Si_2ON_2$ and an outer layer of scandium disilicate. A tantalum oxide alloy environmental barrier coating may be formed on the oxidation barrier coating and a stabilized zirconia thermal barrier coating may be formed on the environmental barrier coating.

In another aspect of the invention, a method for protecting silicon based substrates comprises the steps of forming an oxidation barrier coating of metallic silicates on the substrate, and may further include forming an alloyed tantalum oxide environmental barrier coating over the oxidation barrier coating, and still further forming a stabilized zirconia thermal barrier coating over the environmental barrier coating.

In a still further aspect of the invention, a method for protecting silicon nitride component substrates comprises the steps of forming a diffusion barrier coating on the substrate, forming an oxidation barrier coating of scandium silicates on the diffusion barrier coating, and may include forming an alloyed tantalum oxide environmental barrier coating over the oxidation barrier coating, and forming a stabilized zirconia thermal barrier coating over the environmental coating.

In still another aspect of the invention, a method for protecting silicon nitride component substrates comprises the steps of forming a diffusion barrier coating on the substrate, forming an oxidation barrier coating of scandium silicates on the diffusion coating, forming a scandium disilicate with up to 10 weight % excess $Sc_2O_3$ environmental barrier coating over the oxidation coating, and may include forming a stabilized zirconia thermal coating over the environmental coating.

In still another aspect of the invention, a method for protecting silicon nitride component substrates comprises the steps of forming a diffusion barrier coating on the substrate, forming a duplex oxidation barrier coating on the diffusion barrier coating consisting of an inner layer of $Si_2ON_2$ and an outer layer of scandium disilicate on the diffusion coating, forming a scandium disilicate with up to 10 weight % excess $Sc_2O_3$ environmental barrier coating over the oxidation coating, and may include forming a stabilized zirconia thermal coating over the environmental coating.

In a further aspect of the invention, a silicate protective barrier coating for a silicon-based substrate includes the step of sintering/heat treating the silicate to densify it and bond it to the substrate in a furnace atmosphere comprised of hydrogen and water vapor; preferably this is a flowing atmosphere and may also include an inert gas. A tantalum oxide alloy environmental barrier coating may be formed on the protective barrier coating and a stabilized zirconia thermal barrier coating may be formed on the environmental barrier coating.

In another aspect of the invention, a scandium silicate protective barrier coating for a silicon-based substrate includes the step of sintering/heat treating the silicate to densify it and bond it to the substrate in a furnace atmosphere comprised of moist hydrogen, which to avoid explosion hazards may also include an inert gas. A tantalum oxide alloy environmental barrier coating may be formed on the protective barrier coating and a stabilized zirconia thermal barrier coating may be formed on the environmental barrier coating.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Airfoils, combustors, and turbine engine components made from silicon nitride and silicon carbide have the potential to substantially improve turbine engine performance. But these silicon-based components require barrier coatings to protect them from the turbine engine-operating environment. In general, the present invention provides a coating system that includes a cation diffusion barrier coating and an oxidation barrier coating of silicon oxynitride and metallic silicates. The diffusion barrier coating prevents undesirable diffusion of cations from the substrate into the coating system. Cations are created in the substrate during formation of substrates made from silicon nitride. Specifically, the cations are from sintering aids used in the creation of the substrate and may include cations of lanthanum or of rare earth compounds of yttrium for example. Their diffusion into the protective oxidation barrier coating is detrimental to the barrier. For example, lanthanum cations promote the growth of undesirably thick, crystallographically unstable silica phases and inhibit the formation of the crystallographically stable silicon oxynitride phase.

Thus, prior art coatings, such as the Tanaka coating described above, can allow migration of cations left over from substrate sintering into the coatings. These cations will create undesirable reactions with the oxidation barrier coating unless the cations from substrate sintering match the compounds used in the coatings. Thus, in Tanaka, if yttrium compounds are used in sintering the substrate, then only yttrium compounds can be used in the oxidation barrier coating. Lanthanum, which is beneficial as a sintering aid in the silicon nitride, is detrimental in the oxidation barrier and environmental barrier coatings. Tanaka avoids lanthanum additions in the silicon nitride to avoid their diffusion into the oxidation barrier and environmental barrier coatings. A diffusion barrier of the present invention allows such additives to be advantageously used in the silicon nitride component without their degrading the properties of the oxidation barrier or environmental barrier coating. A barrier coating system using a diffusion barrier coating on the substrate as also disclosed in the present invention does not have the limitation of requiring the compounds used in substrate sintering to match the compounds used in individual coatings of the system. Thus, with a diffusion barrier coating of the present invention there can be a sintering aid of for example lanthanum used in the substrate and a scandium compound used in the oxidation barrier coating, and the diffusion barrier coating will prevent undesirable interaction.

The diffusion barrier coating not only expands the use temperatures and times of the coatings, but also allows the base silicon nitride composition to be optimized to achieve the best properties, for instance optimizing the mechanical properties rather than the thermal. In short, the diffusion barrier expands the substrates that the coating can be successfully applied to.

Figure 1:
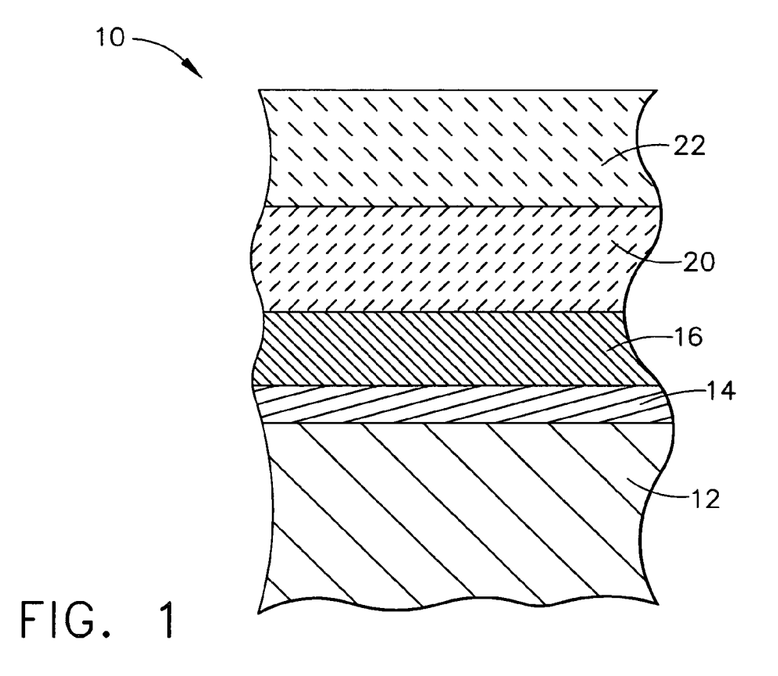
FIG. 1 shows a cross section of a coating system of the present invention.

Referring now to FIG. 1, a barrier coating system 10 may protect a substrate 12 which can be of silicon nitride or silicon carbide. A diffusion barrier coating or layer 14 can be formed directly over the substrate 12. This diffusion barrier coating 14 can have a useful thickness range of about 0.5 to 10 microns, with a preferred thickness range of 0.5 to 5 microns. The diffusion barrier coating 14 may be made of $Si_3N_4$, SiC or $Si_2ON_2$ to prevent diffusion from the substrate 12 of cations to other layers within the coating system 10 (described below) that are above the diffusion barrier coating 14. The $Si_3N_4$, SiC or $Si_2ON_2$ may be present in the diffusion coating 14 usefully at about 99 to 100 mol %, and preferably at about 99.9 to 100 mol %.

An oxidation barrier coating 16 can be directly over the diffusion barrier coating 14 and is intended to inhibit oxidation of the diffusion barrier coating 14 or substrate 12 by minimizing the diffusion of oxygen which can pass through a thermal barrier coating 22 and an environmental barrier coating 20 described below. The oxidation barrier coating 16 can comprise metallic silicate such as scandium disilicate, rare earth silicates, or a duplex oxidation barrier layer consisting of $Si_2ON_2$, and an outer layer of disilicate, or a layer of silicon oxide and a layer of rare earth disilicate. $Sc_2Si_2O_7$ is the preferred disilicate, while useable examples of rare earth disilicates can include $Y_2Si_2O_7$, and $Yb_2Si_2O_7$. The metal disilicates may contain up to 10 weight % excess metal oxide having the same base metal as the disilicate. Usefully, the oxidation barrier coating 16 is not greater than about 30 microns thick. An oxidation barrier coating 16 not greater than about 10 microns is more preferred to limit the weight of the oxidation coating 16, which is desirable in order to reduce the overall weight of substrates treated using the coating system 10. If silica is a constituent of a duplex oxidation barrier, its thickness must be less than 7 microns. An oxidation barrier coating 16 of 10 microns adds little weight to the substrate 12 when compared to much thicker oxidation barrier coatings proposed in the prior art such as that of Tanaka which has a preferred thickness range of 50 to 500 microns.

An environmental barrier coating 20 may be deposited directly over the oxidation barrier coating 16. The environmental barrier coating 20 is intended to prevent water vapor from forming volatile $Si(OH)_4$ phase within the coating system. The environmental barrier coating 20 can comprise tantalum oxide alloyed with lanthanum oxide, or can be scandium silicate ($Sc_2Si_2O_7$) mixed with up to 10 weight % of scandium monosilicate ($Sc_2SiO_5$) and scandium oxide ($Sc_2O_3$). For example, the environmental coating 20 may comprise about 90 to 99 mol % of tantalum oxide and about 1 to 10 mol % lanthanum oxide or alumina. A preferred range would be about 93 to 99 mol % tantalum oxide and about 4 to 7 mol % lanthanum oxide, or 1 to 3 mol % alumina, as detailed in U.S. Pat. No. 6,159,553 and US patent 202136835 A1.

Alternately, the environmental barrier coating 20 may comprise about 90 to 100 weight % $Sc_2Si_2O_7$ with 0 to 10 weight % $Sc_2SiO_5$ and $Sc_2O_3$, with a preferred range of 90-93 weight % $Sc_2Si_2O_7$ and 7-10 weight % $Sc_2SiO_5$ and $Sc_2O_3$. A useful thickness for the environmental barrier coating 20 is about 5 to 50 microns. A preferred thickness is about 10 to 20 microns in order to minimize the weight of the system 10. The environmental barrier coating 20 can have thermal expansion rates similar to the silicon-based substrate 12 so that a minimum of thermal induced stresses occurs during operational temperature cycles in excess of about 1200° C. (2200° F.).

Finally, a thermal barrier (or shield) coating 22 may be deposited directly over the environmental barrier coating 20 and can form the top or uppermost coating of the protective coating system 10. The thermal barrier coating 22 is intended to prevent erosion and pitting of the underlying layers within the coating system 10 and ultimately of the substrate 12. The thermal barrier coating 22 also minimizes the temperature of the underlying environmental and oxidation barrier layers within the coating system 10 and the substrate 12 because of the low thermal conductivity of the thermal barrier coating 22. For example, in an environment of ~1650° C. (3000° F.) combustion gases, the thermal barrier coating 22 can limit the heat transfer to the environmental barrier coating 20 while maintaining the temperature of the environmental barrier coating 20 and substrate 12 to less than ~1400° C. (2550° F.). The thermal barrier coating 22 may be made of stabilized zirconia (e.g., zirconium oxide and 7-30% of yttrium oxide). For the thermal barrier coating 22 providing the function of a shield to particle erosion or corrosive dust deposits, a useful thickness range is about 10 to 40 microns and a preferred thickness range is about 10 to 25 microns.

For air-cooled or non-rotating components, such as combustors, turbine blade outer air seals (turbine shrouds), and air-cooled airfoils, the thermal barrier layer of the coating system may be substantially thicker, in the range of 40 to 2000 microns. In contrast, for rotating turbine airfoils the coating is preferably thin to minimize weight. For these applications, the barrier coating system 10 may have a total thickness in the range of 30 to 100 microns, with a thickness range of 30 to 75 being preferred, and a thickness range of 30 to 50 microns being more preferred.

Figure 2:
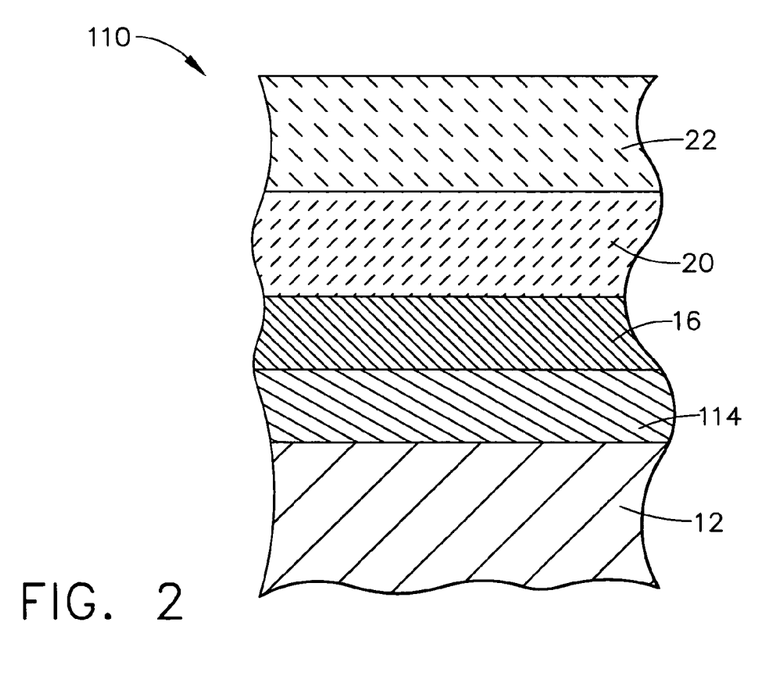
FIG. 2 shows an alternate embodiment of the present invention.

Referring now to FIG. 2, an alternate embodiment of a barrier coating system 110 is shown with a substrate 12 which can be of silicon nitride or silicon carbide. In this system 110, a silica layer 114 can be directly formed on the substrate 12 as compared to a deposited diffusion barrier layer 14 in the embodiment of FIG. 1. Once formed, the silica layer 114 acts primarily as an oxidation barrier but also improves bonding. The oxidation barrier coating 16 may be directly over the silica layer 114, the environmental barrier coating 20 may be directly over the oxidation barrier coating 16, and the thermal barrier coating 22 may be directly over the environmental barrier coating 20. In the embodiment of FIG. 2 using the scandium disilicate for both the oxidation and environmental barriers can be advantageous.

The silica layer 114 may have a useful thickness of not more than about 10 microns, a preferred thickness of not more than about 5 microns, and a more preferred thickness of not more than about 2 microns. The oxidation barrier coating 16, environmental barrier coating 20, and thermal barrier coating 22 can have the same characteristics as in the embodiment of FIG. 1.

Figure 3:
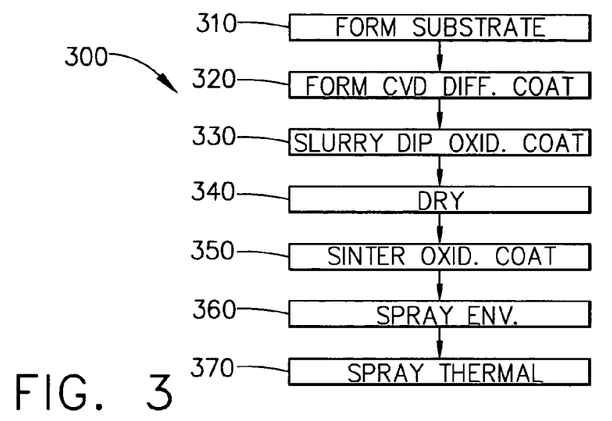
FIG. 3 shows a method of applying the coating system of FIG. 1.

Referring now to FIGS. 1 and 3, a slurry dip process 300 can form the barrier coating system 10 on the substrate 12.

The surface of the substrate 12 can be formed in a step 310 by conventional means such molding or machining.

The diffusion barrier coating 14 can be formed directly on the substrate 12 by conventional means, such as physical vapor deposition or a chemical vapor deposition step 320. Both processes can create a uniform 5 micron or less diffusion coating 14.

A step 330 can mix a fine (<40 micrometer) powder of the silicate with distilled water to form a dipping solution. As an example, a water-based slurry of about 20-25 grams of powder mixed with 100 cc of water can be used. In the step 330, dipping the substrate 12 into the above slurry of metallic silicate can result in forming a coat of metallic silicate with all substrate 12 covered. Typically, in step 330, dipping the substrate 12 up to about 8 times can be used to build the metallic silicate oxidation coating 16 that will insure complete coverage of the substrate 12. The oxidation coating 16 can be allowed to dry in a step 340 between dipping steps 330. Alternatively, the slurry may be sprayed on to the substrate 12 using an air driven spray gun.

After the final dipping step 330 and drying step 340, the coated substrate 12 can then be placed into a vacuum furnace, and sintered in a step 350. This can involve heating in vacuum to about 1000° C. (1800° F.), switching to a nitrogen atmosphere or atmosphere of other inert gas, and then sintering the coated substrate 12 at a temperature of about 1500° C. (2730° F.) to 1650° C. (3000° F.), with a range of about 1550° C. to 1650° C. (2820-3000° F.) being preferred, and a range of about 1575° C. to 1625° C. (2867-2960° F.) being more preferred. At high temperatures exceeding 1700° C. (3090° F.), the oxidation coating 16 may melt and fuse with the substrate 12, which is undesirable in the present invention. Prior art systems such as that proposed by Tanaka require sintering at temperatures above 1650° C. (3000° F.). Tanaka routinely specifies 1700 to 1800° C. (3090-3270° F.) and such a high sintering temperature can compromise the strength properties of the substrate.

Alternatively, sintering in a step 350 may be performed in a hydrogen environment. This can involve heating in a flowing gas of hydrogen which may be "moistened" by bubbling it through water. Use of 5% hydrogen in an inert gas avoids the safety issues associated with pure hydrogen. The furnace is heated to the sintering temperature of about 1250° C. to 1600° C. (2280-2910° F.), with a range of about 1300° C. to 1550° C. (2370-2820° F.) being preferred, and a range of about 1350° C. to 1500° C. (2460-2730° F.) being more preferred.

The use of wet hydrogen and low temperatures allows a coating to be formed that does not contain cations from the silicon nitride substrate. After sintering in moist hydrogen there is no lanthanum detectable in the scandium disilicate coating, while in contrast when the prior art system is used even at lower temperatures than previously reported large concentrations of lanthanum are found in the coating. In contrast, prior art systems such as that proposed by Tanaka require sintering at temperatures above 1650° C. (3000° F.). Tanaka routinely specifies 1700 to 1800° C. (3090-3270° F.) and such a high sintering temperature as previously described promotes the diffusion of cations and can compromise the strength properties of the substrate.

Once the oxidation barrier coating 16 is sintered by a step 350, the coating system 10 may be completed by forming the environmental barrier coating 20 by a conventional EB-PVD (electron beam evaporation-physical vapor deposition) or plasma spray step 360. Finally, the thermal barrier coating 22 maybe EB-PVD or plasma sprayed in a step 370 over the environmental barrier coating 20. This slurry dip process 300 is the preferred process to form the coating system 10, particularly on complex geometry components, such as integral turbines and nozzles. For components with acceptable line of sight conditions, such as combustors, turbine shrouds, and individual turbine airfoils, the oxidation barrier, environmental barrier, and thermal barrier coating layers of the coating system may be formed by conventional processes, such as plasma spraying and EB-PVD.

Figure 4:
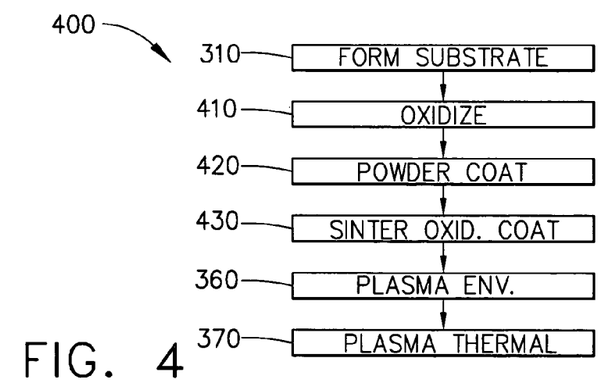
FIG. 4 shows a method of applying the coating system of FIG. 2.

Referring now to FIGS. 2 and 4, an alternative method to form the barrier coating system 110 is described. A powder coat method 400 starts with conventionally forming a substrate 12 surface as in the above embodiment of FIG. 3. The $SiO_2$ layer 114 can be formed over the substrate 12 by pre-oxidizing the substrate 12 in air in a step 410 to form the $SiO_2$ layer 114 on the surface of the substrate 12. A temperature of about 1200 to 1400° C. (2200-2550° F.) (preferably about 1300° C. (2370° F.)) for about 1 to 10 hours (preferably less than 3 hours) in about 1 atmosphere of air can result in a $SiO_2$ layer 114 having a thickness of about 0.5 to 10 microns. Times longer than 7 hours or temperatures higher than 1400° C. (2550° F.) can result in an undesirably thicker $SiO_2$ coating with 2 or more distinct layers or forms (including crystalobite) of $SiO_2$ which may produce undesirable cracks or separations. Times shorter than 7 hours may be used to produce thinner layers of $SiO_2$. Scandium silicate or (Y,Yb)-silicate powder deposited in a step 420 over the $SiO_2$ layer can react with the $SiO_2$ upon sintering in a step 430 to form a single protective oxidation barrier coating 16. This process forms a bond between the substrate 12 and the oxidation barrier coating 16.

Once the oxidation barrier coating 16 is formed by sintering step 430, the coating system 110 can be completed by forming the environmental barrier coating 20 by EB-PVD or plasma spray in step 360 over the oxidation barrier coating 16. Finally, the thermal barrier coating 22 of stabilized zirconia can be EB_PVD or plasma sprayed in step 370 over the environmental coating 20.

Referring to FIGS. 1-5, an alternative method of forming the barrier coating system 10 is to use a sol gel process 500. Initially, the diffusion barrier coating 14 can be applied to the substrate 12 by chemical vapor deposition in a step 320. Chemical vapor deposition can create a uniform 0.5 to 10 micron thick diffusion barrier coating 14. The sol gel process 500 can be used to deposit the oxidation barrier coating 16. The substrate 12 can be dipped in a step 510 in the gel solution made of metallic hydroxides. A sol gel film coats the substrate 12. The substrate 12 coated with sol gel film can be placed in air where the metallic hydroxide of scandium or rare earth reacts with the moist air to form a metallic oxide. Silica is added to the oxidation barrier coating by a similar sol gel process. This reaction can take several minutes to 12 hours. Once the reaction has occurred, the oxidation barrier coating 16 may be dried in a step 520 at about 200 to 600° C. (390-1100° F.) (preferably about 300° C. (575° F.)) and multiple layers can be built by repeating dip step 510 and dry step 520 to create the oxidation barrier coating 16. Typically, 3 coats can be used to cover any flaw in one layer and to build an oxidation barrier coating 16 of 1-2 micrometers. The oxidation barrier coating 16 can then be heat treated in a step 530 at a temperature less than the melting point of the coating of metallic oxide, in a range of 600-1650° C. (1100-3000° F.) depending upon requirements, such as strength of the substrate, which can be adversely affected by higher sintering temperatures, to form a metallic silicate.

Figure 5:
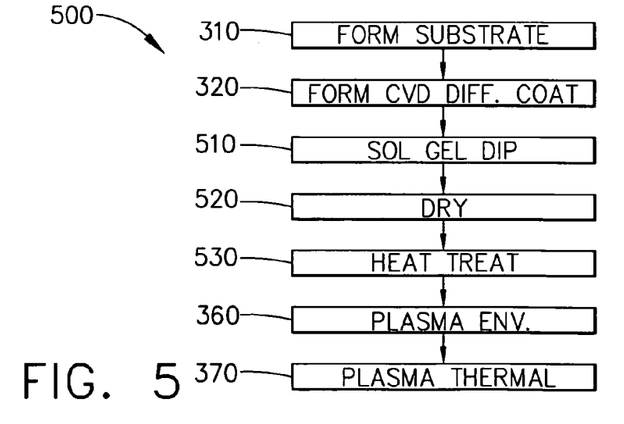
FIG. 5 shows an alternate method of applying the coating system of FIG. 1.

Advantages of the sol gel process 500 are that it is inexpensive, and allows the coating of complex shapes with a uniform dense oxidation barrier coating 16. Use of a 1500° C. (2730° F.) sintering temperature is particularly advantageous because it permits sintering of the oxidation barrier coating 16 to become an integral part of the substrate 12 production as a 1500° C. (2730° F.) heat treatment temperature is currently used to crystallize the silicate grain boundary in the silicon nitride substrate 12.

Once the metallic silicate oxidation barrier coating 16 is in place on the substrate 12, the environmental barrier coating 20 of alloyed tantalum oxide and the thermal barrier coating 22 of stabilized zirconia can be formed by well-known processes such as EB-PVD or plasma spraying. The environmental barrier coating 20 can inhibit water vapor reaction between environmental moisture and the substrate 12. The outer thermal barrier coating 22 can inhibit heat transfer between the environment and the substrate 12 as well as protect the underlying oxidation coating 16 from erosion and contact with corrosive dust.

Figure 6:
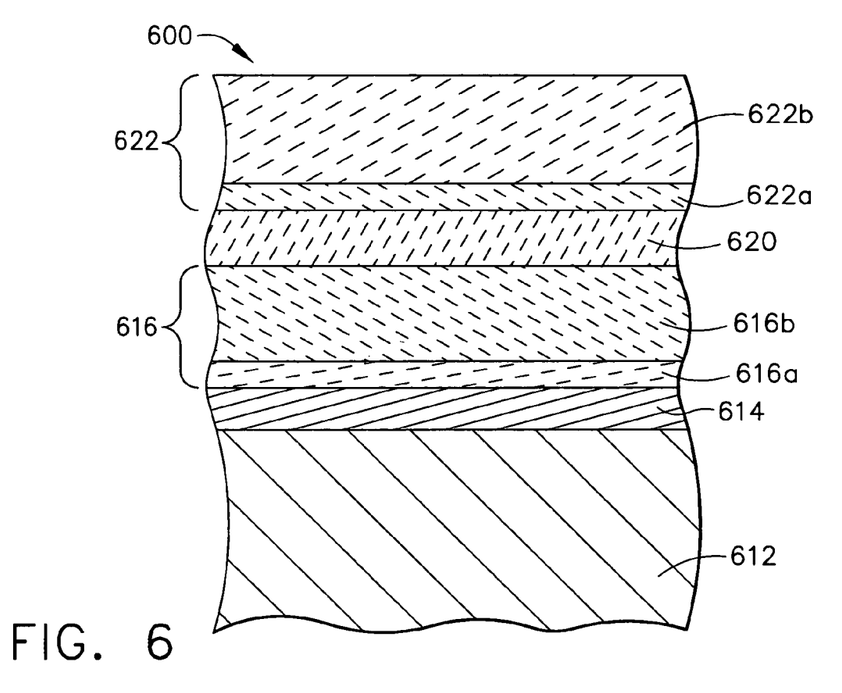
FIG. 6 shows an alternate embodiment of the present invention.

FIG. 6 shows an alternate embodiment system 600. This embodiment includes a substrate 612 covered by a chemical vapor deposition deposited diffusion barrier 614 of 5 micron thick $Si_3N_4$ which blocks diffusion of grain boundary oxides such as $La_2O_3$, $Y_2O_3$, and SrO into the oxidation barrier coating 616. A silica free oxidation barrier coating 616 includes a thermally grown layer of $Si_2ON_2$ 616a and a deposited $Si_2ON_2$ layer 616b deposited by plasma spray, electron beam evaporation-physical vapor deposition, chemical vapor deposition, or slurry dip as described above. The coating system 600 is expected to have stable, crystalline phases for a few hundred degrees above the maximum 2700° F. (1500° C.) temperature capability of the silicon nitride substrate 612. Crystalline phases provide the coating system 600 with improved resistance to high-temperature creep, relative to viscous glassy phases. Maximum temperature capability of this coating system 600 appears to be limited by the $ZrO_2$—$ZrSiO_4$ eutectic, which occurs at about 1676° C. (3050° F.), which significantly exceeds the maximum temperature capability of the silicon nitride substrate 612. Also note that the thickness of the oxidation barrier coating 616 layer is not limited by a disruptive phase transformation. Consequently the upper limit for the thickness of layer 616 is about 40 microns. In contrast, when silica is the oxidation barrier coating as in the embodiment of FIG. 1, the maximum thickness of the oxidation barrier coating 16 is about 10 microns; above this thickness, crystoballite forms and cracks during cooling, which leads to coating failure. A thicker oxidation barrier coating layers 616, possible in this embodiment, provide more resistance to oxidation. In barrier coating 600 the environmental barrier coating 620 can be less than 10 micron thick $(Y,Sc)_2Si_2O_7$.

The environmental coating 620 can be deposited by electron beam evaporation-physical vapor deposition, plasma spray or slurry as described above. The thermal barrier coating 622b of stabilized zirconia can also be deposited by electron beam evaporation-physical vapor deposition, plasma spray or slurry as described above. Subsequent high-temperature exposure, which may occur during exposure to the service environment, may produce an interfacial zone 622a comprising thermally grown $ZrSiO_4$, $(Y,Sc)_xSi_2O_7$ and $ZrO_2$.

Figure 7:
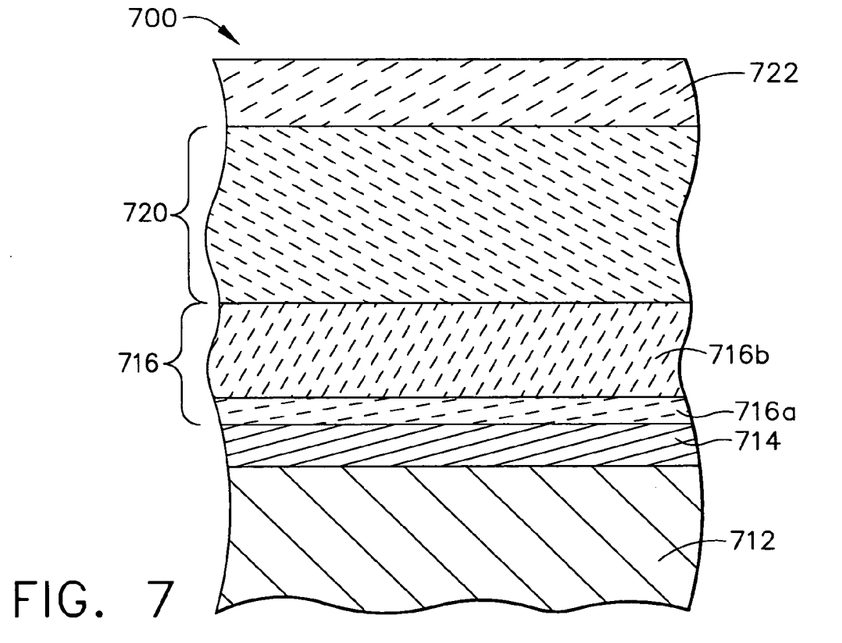
FIG. 7 shows an alternate embodiment of the present invention.

FIG. 7 shows yet another embodiment of the coating system 700. This coating system 700 is also expected to have stable, crystalline phases above the maximum 2700° F. (1480° C.) substrate 712 temperature capability. Crystalline phases provide the coating system 700 with improved resistance to high-temperature creep, relative to viscous glassy phases. This embodiment includes a substrate 712 covered by a chemical vapor deposition deposited diffusion barrier 714 of 5 micron thick $Si_3N_4$ which blocks diffusion of grain boundary oxides such as $La_2O_3$, $Y_2O_3$, and SrO into the oxidation barrier coating 716. Like the embodiment of FIG. 6 a silica free oxidation barrier coating 716 includes a thermally grown layer 716a of $Si_2ON_2$ and a deposited layer of $Si_2ON_2$ 716b. The environmental barrier coating includes a deposited layer 720 of 20 micron thick $Ta_2O_5$ with 25% $TaAlO_4$. Maximum temperature capability of this coating system 700 appears to be limited by the $Ta_2O_5$—$SiO_2$ eutectic, which occurs at about 1570° C. (2860° F.), which significantly exceeds the maximum temperature capability of the AS950 silicon nitride substrate 712. The thickness of the oxidation barrier coating 716 layer is not limited by a disruptive phase transformation. Consequently the upper limit for the thickness of layer 716 is about 40 microns. This barrier coating system 700 has the advantage that $Ta_2O_5$ in the environmental coating 720 has demonstrated adhesion to yttria stabilized zirconia thermal barrier coatings 722. In barrier coating system 700, the environmental coating 720 and the thermal barrier coating 722 can be deposited by electron beam evaporation-physical vapor deposition, plasma spray or slurry as described above. The thermal barrier coating 722 can be a stabilized zirconia.

Interfaces between coatings, represented by lines in FIGS. 1, 2, 6 and 7 may be either discrete or compositionally graded. Also, the thickness of the $Ta_2O_5$+$TaAlO_4$ layer and the stabilized zirconia layer may be significantly thicker on non-rotating components.

Though not shown, the protective disilicate oxidation barrier coatings as described herein for coating Si based substrates were also found to be useful as a braze for joining together two or more components. The protective disilicate braze coatings were dip deposited on the surface of silicon nitride substrate components. These components were then placed in contact with each under a small pressure as is usual for producing a braze joint. The two components were then brought up to a temperature of around 1500° C. (2700° F.) and held at temperature for 4 hours as previously described. The result was the formation of a braze joint of a metallic silicate from the group of silicates $Sc_2Si_2O_7$, $Y_2Si_2O_7$, $Y_2SiO_5$ and $Yb_2Si_2O_7$ between the two silicon nitride substrate components. Therefore, it is to be understood that the protective disilicate oxidation barrier coatings of the present invention may be advantageously used as a braze for joining together components, for elevated temperature applications (e.g., up to about 2400° F. (1315° C.)), for example, for joining together ceramic components, such as Si based components. This brazing can occur simultaneously to applying the protective coating to the substrate. Once the oxidation coating brazes the two components together the resulting combination can be treated as a single component in applying any of the processes above. The resulting brazed component can be used at elevated temperatures up to about 2400 F (1315C) as described above.

It should be understood, of course, that the foregoing relates to preferred embodiments of the invention and that modifications may be made without departing from the spirit and scope of the invention as set forth in the following claims.

We claim:

1. A protective barrier coating for a silicon based substrate, comprising:
   a diffusion barrier coating formed on a substrate, said diffusion barrier coating inhibiting or preventing diffusion of cations from the substrate to an oxidation coating;

an oxidation barrier coating formed on the diffusion barrier coating, said oxidation barrier coating comprising a metal disilicate for inhibiting or preventing the oxidation of the substrate;

an environmental barrier coating comprising tantalum oxide or an alloy thereof formed on the oxidation barrier coating for preventing water vapor from reacting with the oxidation barrier coating to form volatile $Si(OH)_4$; and a thermal barrier coating formed on the environmental barrier coating, said thermal barrier coating limiting heat transfer from an environment to said environmental barrier coating and shielding the environmental barrier coating from erosion and corrosive dust, wherein said thermal barrier coating includes zirconium oxide alloyed with yttrium oxide.

2. A protective barrier coating for a silicon based substrate, comprising:

an oxidation barrier coating formed on the substrate, said oxidation barrier coating comprising a metallic disilicate;

an environmental barrier coating formed on the oxidation barrier coating, said environmental barrier coating comprising a compound selected from the group consisting of a tantalum oxide alloy and a scandium silicate mixture; and a thermal barrier coating formed on the environmental coating, said thermal coating comprising stabilized zirconia.

3. The barrier coating of claim 2, wherein said metallic disilicate is at least one silicate selected from the group consisting of scandium, yttrium and ytterbia.

4. The barrier coating of claim 3, wherein said environmental barrier coating includes a metallic disilicate and up to 10 weight % of a metallic oxide or monosilicate of the same metal as the disilicate selected from the group of scandium, yttrium and ytterbium.

5. The barrier coating of claim 2, wherein the oxidation barrier layer has a duplex structure consisting of an inner layer of $Si_2ON_2$ disposed between the silicon nitride substrate and the outer metallic disilicate layer.

6. The barrier coating of claim 2, wherein said tantalum oxide alloy is alloyed with an oxide, wherein the oxide is selected from one of the group consisting of about 4 to 7 mol % lanthanum oxide and about 1-3 mol % alumina.

7. The barrier coating of claim 2, wherein said metallic silicate is deposited on said substrate by at least one of the steps selected from the group consisting of spraying and dipping the substrate in a water based slurry of at least one of the disilicates selected from the group consisting of scandium, yttrium and ytterbium.

8. A combination silicon based substrate and a barrier coating comprising:

the silicon based substrate being selected from the group consisting of silicon carbide and silicon nitride, a diffusion barrier coating in the range of 99 to 100% pure $Si_3N_4$, SiC or $Si_2ON_2$ on said substrate;

an oxidation barrier coating formed on the diffusion coating, said oxidation coating comprising a metallic disilicate; and an environmental barrier coating formed on the oxidation coating, said environmental coating made of a compound selected from the group consisting of a tantalum oxide alloy and scandium disilicate.

9. The combination of claim 8, wherein the oxidation barrier layer has a duplex structure consisting of an inner layer of $Si_2ON_2$ disposed between the substrate and an outer metallic disilicate layer, the maximum thickness of the $Si_2ON_2$ layer is not greater than 40 microns.

10. The combination of claim 8, wherein said metallic disilicate is at least one silicate selected from the group consisting of scandium, yttrium and ytterbia and said metallic silicate can contain up to 10 weight % of a metal oxide wherein said metallic silicate and said metallic oxide have the same base metal.

11. The combination of claim 8, wherein said tantalum oxide alloy is alloyed with an oxide wherein the oxide is selected from the group consisting of lanthanum oxide and alumina.

12. The combination of claim 8, wherein the protective barrier coating includes a thermal barrier coating formed on the environmental coating, said thermal barrier coating comprising stabilized zirconia.

13. A protective barrier coating for a silicon based substrate comprising:

a diffusion barrier coating formed on the substrate;

an oxidation barrier coating of scandium disilicate formed on the diffusion barrier coating;

an environmental barrier coating formed on the oxidation barrier coating and comprising one of a tantalum oxide alloy and a mixture of scandium disilicate, scandium monosilicate and scandium oxide; and the protective barrier coating also comprises a thermal barrier coating formed on the environmental barrier coating and comprising stabilized zirconia.

14. The protective barrier coating of claim 13, wherein said diffusion coating is in a range of about 0.5 to 10 micron thick layer of over 99% pure silicon based material selected from the group consisting of $Si_3N_4$, SiC or $Si_2ON_2$.

15. The protective barrier of claim 13, wherein said oxidation barrier coating has a duplex structure consisting of an inner layer of $Si_2ON_2$ disposed between the substrate and the outer metallic disilicate layer.

16. The protective barrier of claim 13, wherein said oxidation barrier coating is in the range of not greater than 40 microns thick.

17. The protective barrier of claim 13, wherein said oxidation barrier coating is in the range of not greater than 20 microns thick.

18. The protective barrier of claim 13, wherein said tantalum oxide alloy includes a metallic oxide selected from the group consisting of lanthanum oxide in the range of 3 to 10 mol % and alumina in the range of 1-3 mol %.

19. The protective barrier of claim 13, wherein said mixture of scandium disilicate, scandium monosilicate and scandium oxide includes scandium disilicate in a range of 60 to 100 weight percent.

20. The protective barrier of claim 13, wherein said environmental barrier coating is in a range of 5 to 50 microns thick.

21. The protective barrier of claim 13, wherein said thermal barrier coating includes stabilized zirconia in a range of 10 to 2000 microns thick.

22. The protective barrier of claim 19, wherein said thermal barrier coating includes stabilized zirconia in a range of 10 to 40 microns thick.

23. The protective barrier of claim 13, wherein said diffusion barrier coating is deposited by physical vapor deposition.

24. The protective barrier of claim 13, wherein said diffusion barrier coating is deposited by chemical vapor deposition.

25. The protective barrier of claim 13, wherein said diffusion barrier coating consists of one of the silicon compounds selected from the group consisting of SiC or $Si_3N_4$, in the range of 99 to 100% pure.

26. The protective barrier of claim 13, wherein said diffusion barrier coating, said oxidation barrier coating, said environmental barrier coating and said thermal barrier coating have a combined thickness in the range of 30-100 microns.

* * * * *